United States Patent [19]

Levine et al.

[11] 4,445,795

[45] May 1, 1984

[54] METHOD AND APPARATUS FOR MERGE PROCESSING IN A TEXT PROCESSING SYSTEM

[75] Inventors: Lewis J. Levine; Kenneth O. Shipp, Jr., both of Austin, Tex.

[73] Assignee: International Business Machines, Armonk, N.Y.

[21] Appl. No.: 305,252

[22] Filed: Sep. 24, 1981

[51] Int. Cl.³ .............................................. B41J 5/30
[52] U.S. Cl. ...................................... 400/63; 400/68; 400/83; 364/300
[58] Field of Search .................... 400/2, 3, 62, 63, 64, 400/76, 83, 67, 68, 279, 705.4, 705.5, 83; 364/200, 300, 900; 340/720, 721, 723, 724

[56] References Cited

U.S. PATENT DOCUMENTS

| | | | |
|---|---|---|---|
| 3,025,941 | 3/1962 | Blodgett et al. | 400/68 |
| 3,696,343 | 10/1972 | Schloss | 364/300 X |
| 3,702,007 | 10/1972 | Davis | 364/300 |
| 4,223,393 | 9/1980 | Abe et al. | 400/83 X |
| 4,240,075 | 12/1980 | Bringol | 400/63 X |
| 4,250,560 | 2/1981 | Dethloff et al. | 400/68 X |
| 4,308,582 | 12/1981 | Berger | 364/300 |
| 4,355,913 | 10/1982 | Rutkowski, Jr. | 400/63 |

FOREIGN PATENT DOCUMENTS

| | | | |
|---|---|---|---|
| 2723945 | 12/1977 | Fed. Rep. of Germany | 400/68 |
| 2801750 | 7/1978 | Fed. Rep. of Germany | 400/63 |

*Primary Examiner*—Ernest T. Wright, Jr.
*Attorney, Agent, or Firm*—Otto Schmid, Jr.

[57] ABSTRACT

An improved method and apparatus in an interactive text processing system for creating documents by selectively merging text data from two or more text records by signalling the location in a document at which the insert of text data is to be added, displaying a Merge Tasks Menu which provides an option for executing a merge operation in response to either Switch Code or Named Variable control codes, specifying the identification and location of the text data comprising the Shell Document and the Fill-In Document, and executing the Merge operation based on the specified data and Merge control mode.

6 Claims, 6 Drawing Figures

| Merging Variables | | | |
|---|---|---|---|
| DSK001 | | | Kyb |

MERGE WITH NAMED VARIABLES SETUP

| ID | ITEM | YOUR CHOICE | POSSIBLE CHOICES |
|---|---|---|---|
| a | Shell Document Name | | |
| b | Diskette Name | | |
| c | Fill-In Document Name | | |
| d | Diskette Name | | |
| e | System Page Number (s) | | |
| f | Merged Document Name | | |
| g | Diskette Name | | |
| h | Print Merged Document | 1 | 1 = Yes   2 = No |
| i | Cancel On Error | 1 | 1 = Yes   2 = No |
| j | Paper Handling | 2 | 1 = Cut Paper, Manual Feed |
|   |   |   | 2 = Cut Paper, Automatic Fee |
|   |   |   | 3 = Continuous Paper |

When finished with this menu, press ENTER.
Type ID letter to choose ITEM; press ENTER:

FIG. 4

| Merging Variables | | | | Kyb |
| --- | --- | --- | --- | --- |
| DSK001 | | | | |

MERGE WITH SWITCH CODES SETUP

| ID | ITEM | YOUR CHOICE | POSSIBLE CHOICES |
| --- | --- | --- | --- |
| a<br>b | Shell Document Name<br>Diskette Name | | |
| c<br>d | Fill-In Document Name<br>Diskette Name | | |
| e<br>f | Merged Document Name<br>Diskette Name | | |
| g | Print Merged Document | 1 | 1 = Yes    2 = No |
| h | Cancel On Error | 1 | 1 = Yes    2 = No |
| i | Paper Handling | 2 | 1 = Cut Paper, Manual Feed<br>2 = Cut Paper, Automatic Feed<br>3 = Continuous Paper |

When finished with this menu, press ENTER.

Type ID letter to choose ITEM; press ENTER:

FIG. 5

METHOD AND APPARATUS FOR MERGE PROCESSING IN A TEXT PROCESSING SYSTEM

DESCRIPTION

1. Background of the Invention

This invention relates to a text processing system and more particularly to means and methods for enabling an operator to merge various keyed entries of text data to create a document on a text processing system.

2. Description of the Prior Art

It is known in the prior art to merge keyed text data to produce a document utilizing stop codes. In a typical application, known as repetitive letters, the operator creates multiple versions of the same document, differing only in variable replacement text included in that document. The repetitive letter is created by keying and storing the master repetitive letter or shell document. The shell document is created in a similar manner to any other letter except that instead of typing the information that will change from letter to letter (for example, the name, address, and salutation), a Switch Code is typed at each point in the shell document where the information that changes will appear. The parts of the letter that change are called variable information or variables, and the Switch Codes enable the operator to locate the places in the letter where the variables are typed.

Pagination functions typically process variable length input lines of text into uniform pages of equal length lines, keep related text on a single page, allow text lines from other documents to be inserted, and make hyphenation decisions or assist an operator of the text processing system in making hyphenation decisions when a word crosses a line ending boundary. The pagination functions are based on the concept of paginating a text document entered by an operator to produce an attractive appearing letter, for example, with equal length lines, etc. An extension of pagination, offered by some text processing systems, allows variable data from a data processing-like file to be merged with a text document to generate a composite document, for example, personalized letters. This capability is generally referred to as "merge file/text" or "auto letters". In this system, the variable data is identified by a "set symbol".

There has developed in the text processing market a requirement for systems providing enhanced operator productivity without requiring programming skills on the part of the text processing system operator.

SUMMARY OF THE INVENTION

In accordance with the present invention, a control system apparatus and method for operating a text processing system is provided which includes an operator interface, usable by an operator with no programming skills, for the creation of documents by selectively merging text data from two or more text records by signalling the location in a document at which an insert of text data is to be added, displaying a first menu to the operator which provides an option to the operator for choosing a merge operation in response to either a first or a second control code. Either a second or a third menu is displayed to the operator in response to the selection of a merge operation in response to either a first or a second control code, and the selected menu enables specifying the identification and location of the document and the text data to be inserted. The data to be inserted is fetched and merged into the document at the signalled location to produce a revised document.

In a specific embodiment, the operator has the option of choosing a merge operation in response to Switch Codes or a merge operation in response to Named Variables.

BRIEF DESCRIPTION OF THE DRAWING

FIG. 4 illustrates the Merge with Named Variables Setup Menu as it would appear on the display device of FIG. 1 in accordance with the present invention;

FIG. 5 illustrates the Merge with Switch Codes Setup Menu as it would appear on the display device of FIG. 1 in accordance with the present invention;

DESCRIPTION OF THE PREFERRED EMBODIMENT

Figure 1:
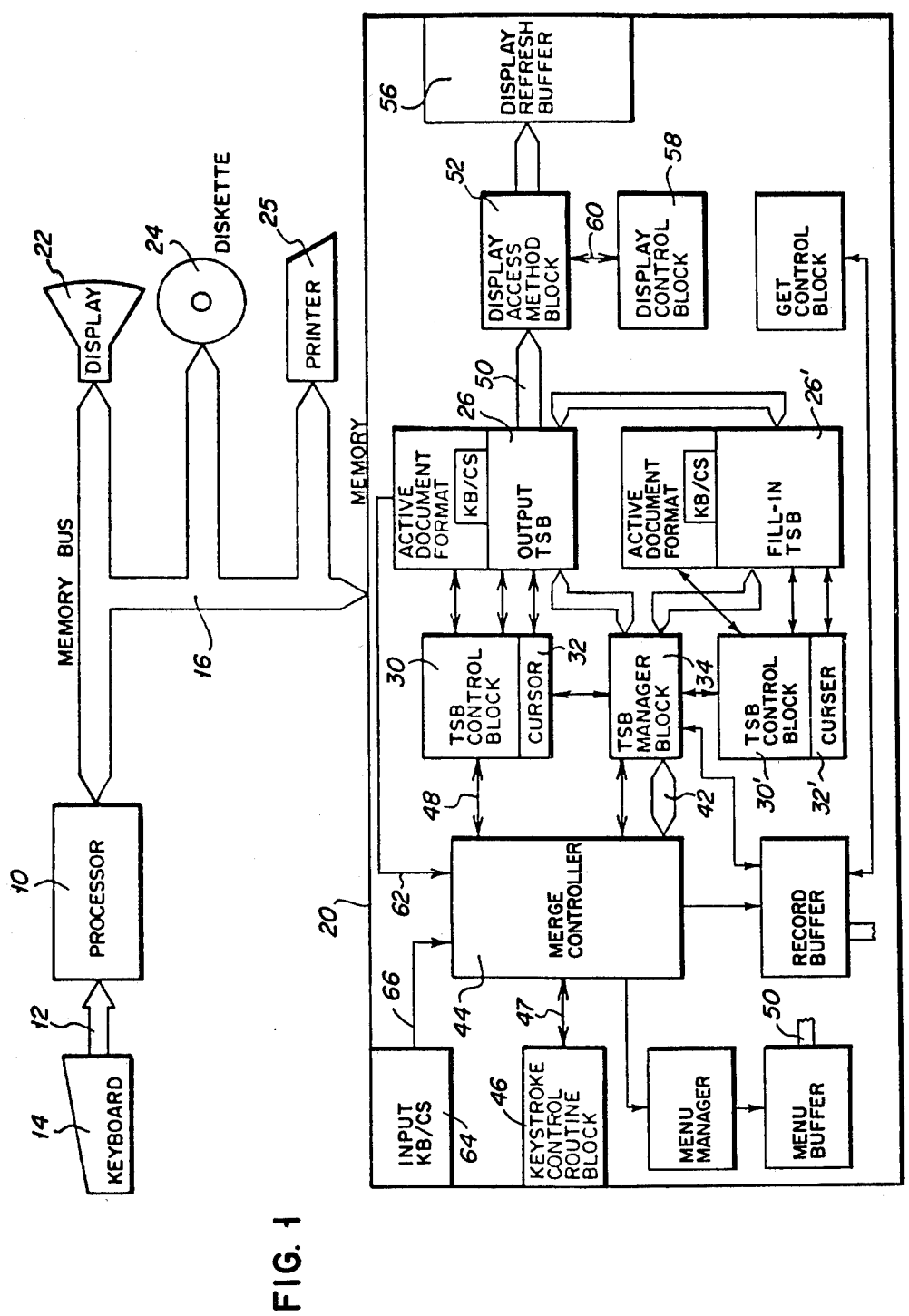
FIG. 1 is a block diagram of the system embodying the present invention.

Referring now to FIG. 1, a portion of the text processing system is shown, including a processor 10 to which is connected a bus 12 leading from a keyboard 14. Character data generated by manual actuation of keyboard 14 applies character-related signals to processor 10 which provides on an output memory bus 16 a data stream in which the characters selected by actuation of keyboard 14 appear suitably encoded.

Keyboard 14 is of the conventional design and arrangement which is commonly used in a Text Processing System such as the IBM Displaywriter System, for example, so a detailed illustration of keyboard 14 is not essential for a proper understanding of the invention. Keyboard 14 comprises a normal set of graphic symbol keys such as letters, numbers, punctuation marks, and special character keys, plus text format or control keys like carriage return, indent, etc. In addition, the keyboard 14 includes a second set of control keys for issuing special control commands to the system. The second set of control keys include cursor movement keys, keys for setting the keyboard into a number of different modes, etc.

Memory bus 16 extends to a memory unit 20, to a display unit 22, to a diskette unit 24 and to a printer 25.

Memory 20 includes text storage buffers 26, 26' which serve to store the coded data stream comprising the text input initially entered through the keyboard 14. Included in the text storage buffers 26, 26' are storage sections for the identity of the active document format which contains the active document keyboard character set namely, in portions 28, 28'.

Text storage buffer control blocks 30, 30' are linked to buffers 26, 26' and include a cursor control section 32, 32'. The text storage buffers 26, 26' are linked to the data on the diskette unit 24 by storage access control blocks (SACB) of conventional design such as that within the above-mentioned Text Processing System, one of which is included within text storage buffer control blocks 30, 30' for each text storage buffer 26, 26'.

A text storage buffer manager 34 is linked by channels 36, 36' to the control blocks 30, 30', by channels 38, 38' to the buffers 26, 26' and by channels 40 and 42 to a merge controller 44.

Merge controller 44 provides the control routines necessary to execute a merge operation in conjunction with text data stored in the Output TSB 26, the Fill-In TSB 26' and the record buffer 27 as will be described in greater detail later in this specification.

A keystroke control routine block 46 is provided to select the appropriate routine for the entered keystroke, and keystroke control routine block 46 is connected to merge controller 44 by channel 47. The control blocks 30, 30' are connected to merge controller 44 by channels 48, 48'. Buffer 26 is coupled by channel 50 to a display access method block 52 which is coupled by way of channel 54 to a display refresh buffer 56. A display control block 58 is coupled by channel 60 to the display access method block 52. GET control block 57 functions to fetch data which is stored in record buffer 27.

In accordance with the present invention, a channel 62 is connected from the active document format storage 28 of buffer 26 to the merge controller 44. Further, an input keyboard character set (KB/CS) block 64 stores the identity of any desired input keyboard character set of keyboard 14 and is connected by way of channel 66 to the merge controller 44.

The display access method block 52 has corresponding access method blocks of conventional design such as that within the above-mentioned Text Processing System for the diskette unit 24 and the printer 25. Each of the blocks serves as an interface to the corresponding unit.

The display refresh buffer 56 contains the actual text which is shown on display unit 22 while the buffer 26 contains all of the display text plus control data.

Menu manager 29 selects the appropriate menu to be displayed on display unit 22 and stores the menu image in menu buffer 31. At the appropriate time, the menu image is transferred by channel 50 to the display access method block 52 for routing to the display refresh buffer 56.

In operation of the system of FIG. 1, the encoded data stream on memory bus 16 is stored in the text storage buffer 26. In the process of correction and editing the contents of the text storage buffer 26, selected portions or lines of a page are presented on display unit 22. Stored in active document format section 28 is the code designating the keyboard character set that was employed in the production of the coded data stream appearing on memory bus 16 leading from processor 10 and applied from text storage buffer 26 to display unit 22 for edit.

If it is necessary, for example, to insert a graphic item into the text displayed on unit 22, then a cursor, conventionally available on such display systems, is placed below the character on display unit 22 at the location immediately preceding which an insert is to be made. The input keyboard character set identification of which the graphic item to be inserted forms a part, is applied by way of channel 66 to the merge controller 44.

Figure 2:
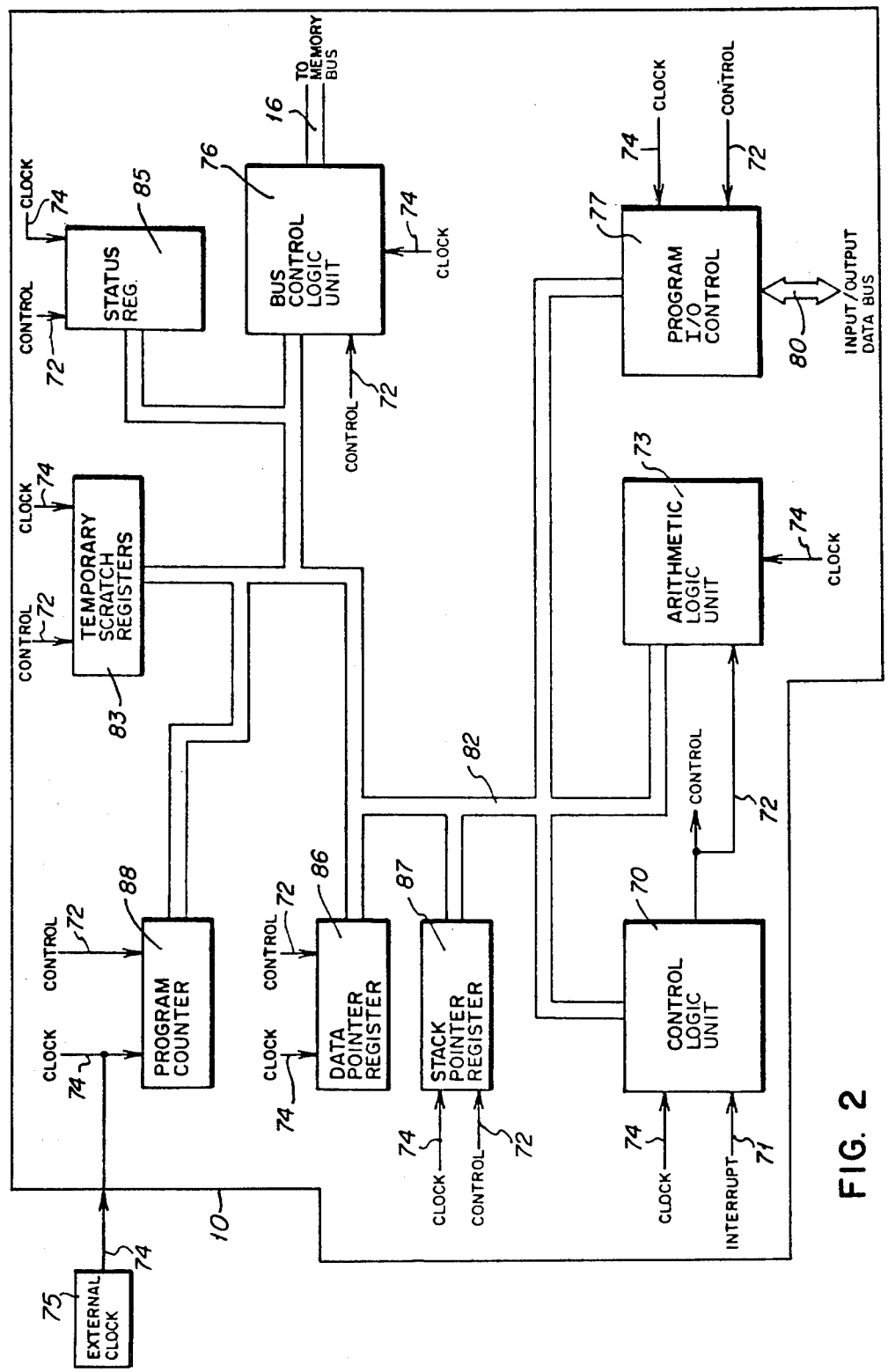
FIG. 2 is a block diagram of the processor shown in FIG. 1.

Referring to FIG. 2, the processor 10 is further detailed to show typical logic hardware elements as found in such processors 10. The processor 10 may be a commercially available unit, such as from Intel Corporation and identified by the number 8086, or any of the recognized functionally equivalent, currently available microprocessors. Typically, the processor 10 includes a control logic unit 70 which responds to interrupts on a device bus 71 from the keyboard 14. The control logic unit 70 is also connected to a data and address bus 82 interconnected to various other logic units of the processor 10.

In response to a fetch instruction from the random access memory 20, the control logic unit 70 generates control signals to other logic elements of the processor 10. These control signals are interconnected to the various elements by means of a control line 72 which is illustrated directly connected to an arithmetic logic unit 73 and identified as a "control" line 72 to other elements of the processor 10. Sequence operation of a control unit 70 with other logic elements of the processor 10 is achieved by means of clock pulses input to the processor 10 from an external clock source 75 on a clock line 74. Line 74 is also shown interconnected to other logic elements of the processor 10 detailed in FIG. 2.

Data and instructions to be processed in the processor 10 are input through a bus control logic unit 76. Data to be processed may also come from program input/output control logic unit 77. The bus control logic unit 76 connects storage elements of the random access memory 20 and receives instructions for processing data received from the input/output control 77 or received from the random access memory 20. Thus, the input/output control logic unit 77 receives data from the keyboard 14 or the random access memory 20 while the bus control logic unit 76 receives instructions and/or data from the same memory 20. Note the different storage sections of the random access memory 20 identifiable for instruction storage and data storage.

Device control information from the processor 10 is output through program input/output control logic unit 77 over a data bus 80. Input data on the data bus 80 from the keyboard 14 is processed internally through the processor 10 by instructions on the bus 82 to temporary scratch registers 83. The arithmetic logic unit 73, in response to a control signal on line 72 and in accordance with instructions received on an input/output data bus 80 performs computations and the results can be stored in the temporary scratch registers 83. Various other transfers of data between the arithmetic logic unit 73 and other logic elements of the processor 10 are, of course, possible. Such additional transfers may be to a status register 85, data pointer register 86 or a stack pointer register 87. A program counter 88 is also connected through the data stream bus 82 to various other logic elements in the processor 10.

A particular operating sequence for the processor 10 is determined by instructions and data on the memory bus 16 and input data on the bi-directional bus 80. As an example, in response to received instructions, the processor 10 transfers data stored in the scratch registers 83 to one of the registers 85, 86 or 87. Such operations of processors as detailed in FIG. 2 are considered to be well known and understood by one of ordinary skill in the data processing field. A detailed description of each operation of the processor 10 in FIG. 2 is not deemed necessary for a full understanding of the present invention as claimed.

Prior to discussing the flow of the merge control routine and its combination with the text processing system of FIG. 1, an overview of the control system is in order. The specific problem addressed is how to provide an operator interface on a display device that permits merging of documents by either switch codes or named variables in a manner that promotes ease of learning by operators with no programming skills, ease of use and compatibility with existing text processing equipment.

The operator creates documents by combining pre-stored text data, paragraphs, or "named variables", which are known as a Shell Document, with pre-stored personalization information known as a Fill-In Document. The Fill-In Document contains one or more Replacement Lists.

The operator has the choice of executing Merge with Switch Codes, as has been done with existing text processing equipment including Magnetic Card equipment, or with Named Variables. The Named Variable allows the operator to mark a position in a document at which "variable" text data is expected to be inserted at a later time. The names of variables (Named Variables) are designated by the operator and may subsequently be used by both the operator and the system for reference. The operator may assign names which relate to the textual information to be inserted (first name or inside address, for example) at the designated position in the document.

To execute a Merge operation each Replacement List in the Fill-In Document is merged with the Shell Document. All of the filled-in copies can be stored in a single operator specified output document and optionally printed if desired. Alternatively, the document can be designated to be only printed.

Preparatory to executing a merge operation, there are two documents which must be input by the operator to the Merge application. These documents are created in Create/Revise mode. The two documents are a Shell document and a Fill-In document.

The shell document is a document containing either variables or switch codes at locations corresponding to the places where variable text is to be inserted. Multiple shells can be created within a single document. Each unique shell is identified by a Begin Using Document Format at the top of the first page of the shell.

The Fill-In Document contains the Replacement List(s). Replacement Lists can be created by keying each replacement value followed by a switch code if Merge with Switch Codes is to be processed. If the switch code approach is used, no separators are keyed between replacement lists (i.e., there is one list and each replacement value is ended with a switch code). If merge is to be processed with named variables, multiple Replacement Lists are separated within a single document by Page End (PE) codes. If the Named Variable approach is used, replacement values must be entered following the appropriate named variable.

Figure 3:
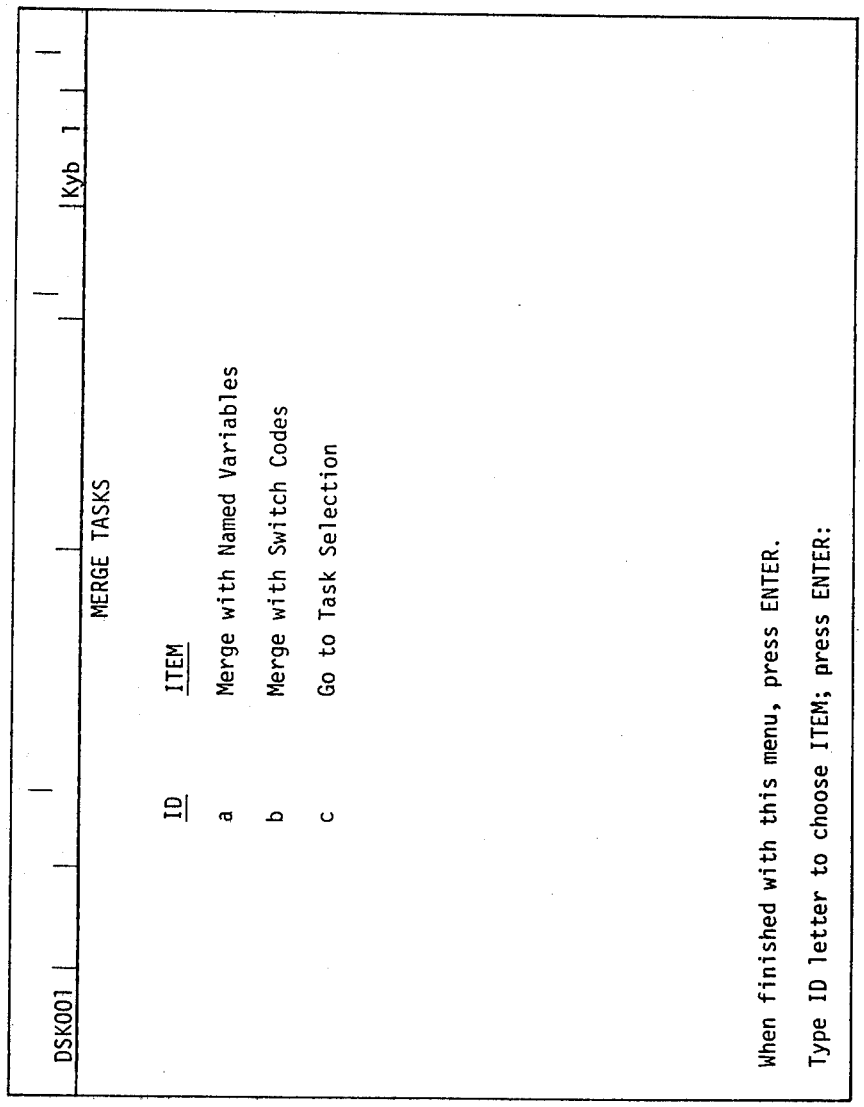
FIG. 3 illustrates the Merge Tasks Menu as it would appear on the display device of FIG. 1 in accordance with the present invention.

Once the Shell Document and the Fill-In Document have been created, the operator selects Merge Tasks from the Task Selection Menu and the Merge Tasks Menu will be displayed. An illustration of the Merge Tasks Menu as it would appear on the display unit 22 is shown in FIG. 3.

A prompt line of the display instructs the operator to type the ID letter to choose an ITEM. The operator makes this selection by typing the appropriate letter in place of the underlined small square at the end of the prompt line of the display and pressing the ENTER key (conventionally placed such as the placement in the above-mentioned Text Processing System, for example) on keyboard 14. The underline represents the position of the cursor and the small square represents the location at which the first keyed character is displayed. For example, to select a Merge with Named Variables, the operator types an "a" in the designated position and presses the ENTER key.

In response to the above selection, the Merge with Named Variables Setup Menu is displayed on the display unit 22, and an illustration of this menu is shown in FIG. 4. This menu instructs the operator to make selections concerning the name and location of the Shell Document, the name, location and page numbers to be used for the Fill-In Document and the name and location to be stored for the Merged Document. These selections are made by keying the appropriate ID letter followed by a space and the designated name.

Should the selection be made to Merge with Switch Codes, the Merge with Switch Codes Setup Menu would be displayed and an illustration of this menu is included in FIG. 5. This menu instructs the operator to make choices for the name and location of the Shell Document and the Fill-In Document and the name and location to be stored for the Merged Document. After all the selections are made, the operator presses the ENTER key to start the Merge process.

Figure 6:
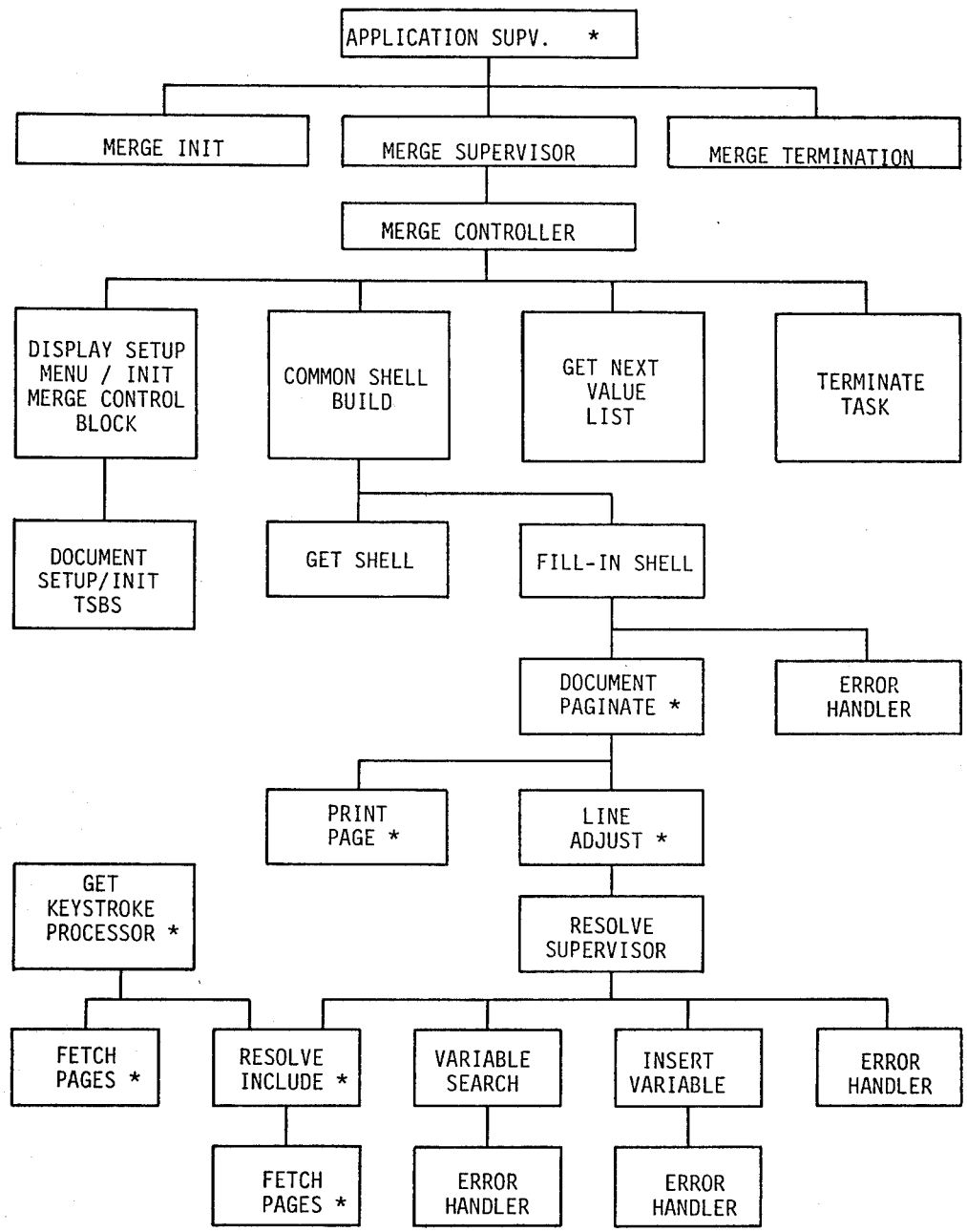
FIG. 6 is a hierarchy diagram of the merge subsystem control routines in accordance with the present invention.

A Hierarchy Diagram of the Merge Subsystem is shown in FIG. 6 which shows the relationship between the various routines used to execute the Merge process. Each of the blocks in FIG. 6 represents a program routine which can be invoked to perform the named function. A description of those routines essential for a proper understanding of the invention is provided in tables at the end of this specification.

These routines include the Merge Start/End routines which function to display the Merge Task Selection Menu and to set up various components and initiate the Merge process. The Merge Controller 44 controls the Merge process and the Merge Shell Build deals with the actual process for building and outputting the Shell Document.

The Shell Document is stored on the designated diskette unit 24 and a copy of the Shell Document is copied into the Output TSB 26. The Fill-In Document is opened and the first page is placed in the Fill-In TSB 26'. Each page includes all the variable information for one document. The pagination routine is then invoked in normal fashion. During this routine, the text in the Output TSB 26 is scanned to detect any control codes. Any control codes such as an INCLUDE instruction, for example, are resolved by the pagination routine by instructing the GET Control Block 57 to fetch any designated data for inclusion into the document included in Output TSB 26 or the part of the document stored in Fill-In TSB 26'. The designated data is fetched one record at a time and the fetched data is stored in record buffer 27 and transferred into the Output TSB 26 as needed. The pagination routine then proceeds to resolve the control codes as encountered. These control codes may be such codes as the previously mentioned INCLUDE instructions or either Switch Codes or Named Variables utilized in the Merge process. In the case of Switch Codes or Named Variables, the data in the Fill-in TSB 26' is scanned and transferred into the designated insert location within the text stored in the Output TSB 26. The pagination routine continues to merge the designated text data into the Output TSB 26 until a page is completed. At a Page End the TSB Manager 34 stores the completed page on the designated diskette unit 24. In addition, if printing is designated by the operator, the page is also sent to the printer 25. The Merge process continues in this manner until all of the pages in the document have been processed.

Suitable program routines in program design language (PDL) for implementing the described Merge control system are shown in the following tables:

DESCRIPTIVE-NAME=MERGE START/END

FUNCTION=The Merge Start/End component (MSE-----) contains the routines necessary to load and delete the routines used by the Merge load. In addition, it contains a routine that will display the Merge Task Selection menu and initiate the Merge process.

TABLE 1
MERGE INITIALIZE

BEGIN (MSEINIT)
PUT UP THE 'LOADING TASK' MODE MSG
LOAD ROUTINES FOR MERGE APPLICATION
IF LOAD RETURN CODE IS NOT FATAL
ALLOCATE AND INITIALIZE DATA AREAS
INITIALIZE POINTER TO DATA AREAS
INITIALIZE THE SACB FIELDS IN MERGE DATA AREAS
INITIALIZE DISPLAY STATUS LINE
ELSE
PUT UP ERROR MESSAGE
ENDIF
RESTORE THE LOADSET RETURN CODE
RETURN TO CALLER
END (MSEINIT)

TABLE 2
MERGE TERMINATION

BEGIN (MSETERM)
DELETE THE MERGE APPLICATION
FREE THE MERGE DATA AREAS
RETURN TO CALLER
END (MSETERM)

TABLE 3
MERGE SUPERVISOR

BEGIN (MSESUPER)
FETCH THE KEYBOARD ARRANGEMENT
PLACE ARRANGEMENT IN THE MERGE DATA AREA
ALLOCATE THE MERGE WORKSPACE
BUILD THE MERGE POOL
ALLOCATE THE SPACE FOR THE TWO TSBS, THE DOCUMENT FORMAT BUFFER, THE VARIABLE FILL-IN PAGE NAME LIST BUFFER, THE MERGE CONTROL BLOCK, AND THE GET PAGE(S) CONTROL BLOCK
CALCULATE AND SAVE THE ADDRESSES OF THE ABOVE DATA AREAS
UNTIL THE OPERATOR CHOOSES THE "RETURN TO TASK SELECTION" OPTION OR CANCELS THE MENU DO
IF THE MENU BUFFER DOES NOT EXIST THEN
ALLOCATE THE MENU BUFFER
ALLOCATE THE MENU DESCRIPTORS
ENDIF
INITIALIZE THE MENU DESCRIPTORS FOR THE MERGE TASK SELECTION MENU
DISPLAY THE MERGE TASK SELECTION MENU
IF OPERATOR DID NOT CANCEL THEN
IF THE OPERATOR CHOSE ONE OF THE MERGE DIRECTIVE OPTIONS THEN
IF SWITCH CODE MERGE WAS CHOSEN THEN
TURN ON THE APPROPRIATE FLAG
ENDIF
CALL THE MERGE PROCESS CONTROLLER
IF MERGE COMPLETED SUCCESSFULLY THEN
DISPLAY "MERGE COMPLETE"
ELSE
IF NO VARIABLES OR SWITCH CODES WERE FOUND THEN

TABLE 3-continued
MERGE SUPERVISOR

ENDIF
ENDIF
ENDIF
ENDIF
ENDDO
IF THE MENU BUFFER EXISTS THEN
FREE THE MENU BUFFER AND THE MENU DESCRIPTORS
ENDIF
FREE THE REMAINING DATA AREAS
FREE THE MERGE POOL
FREE THE MERGE WORKSPACE
RETURN TO CALLER
END MSESUPER

DESCRIPTIVE-NAME=MERGE CONTROLLER

FUNCTION=The Merge Controller component (MCN-----) contains the routines which control the Merge process. This component controls Repetitive Letters and Document Assembly functions for both named VARIABLEs and switch code Merge. This component detects all *setup* errors and redisplays the appropriate setup menu so the operator may correct the error.

TABLE 4
MERGE CONTROLLER

BEGIN MCNCNTLR
INITIALIZE THE SACBS IN THE MAVT
INVOKE MCNSMENU - DISPLAY AND PROCESS THE APPROPRIATE SETUP MENU
IF MEDIA OUTPUT THEN
SET UP FOR OUTPUT DOCUMENT
ENDIF
IF THE OPERATOR DID NOT ABORT THEN
SET THE DEFAULT INCLUDE DISKETTE NAME FIELD IN THE GET CONTROL BLOCK
DISPLAY THE MERGING MESSAGE ON THE DISPLAY STATUS LINES
FREE THE MENU DESCRIPTORS AND MENU BUFFER
WHILE MERGE_NOT_FINISHED -AND- THE ABORT FLAG IS OFF DO
IF NO TERMINAL ERROR OCCURRED THEN
UNTIL A PAGE IS FOUND OR NO MORE PAGES DO
INVOKE MSBBUMPV - READ THE NEXT VARIABLE LIST INTO THE TSB
ENDIF
IF THE MERGE_FINISHED FLAG WAS NOT SET THEN
IF NO TERMINAL ERROR OCCURRED THEN
INVOKE MSBBLDSH - MERGE THE DOCUMENT
ENDIF
IF ANY TERMINAL ERRORS OCCURRED (IN MSBBUMPV OR MSBBLDSH) THEN
TURN ON THE ABORT FLAG (TO TERMINATE MERGE) AND CALL THE ERROR HANDLER SUBROUTINE
ELSE
POLL FOR REQUEST OR END KEYS
IF REQUEST WAS HIT THEN
PASS CONTROL TO THE REQUEST KEY PROCESSOR
CLEAR THE SCREEN
ENDIF
ENDIF
ENDIF
ENDDO
INVOKE MSBCOMP - BRING THE MERGE TASK TO AN ORDERLY HALT
ENDIF
IF MSBCOMP HAD A TERMINAL ERROR THEN
CHECK FOR AND HANDLE ANY ERRORS
ENDIF
IF MERGE WAS ABORTED DUE TO ERRORS THEN
IF PRINT ONLY AND NO PAGES FOUND THEN
PUT UP NO PAGES FOUND MESSAGE
ELSE

TABLE 4-continued
MERGE CONTROLLER

DISPLAY THE 'MERGE UNSUCCESSFUL' MESSAGE
ENDIF
ENDIF
CLEAR THE MERGING MESSAGE ON DISPLAY
STATUS LINES
RETURN TO THE CALLER
END MCNCNTLR

TABLE 5
SETUP MENU

BEGIN (MCNSETUP)
OPEN THE SHELL DOCUMENT
OPEN THE VARIABLE FILL-IN DOCUMENT
IF OUTPUT IS NOT 'PRINT ONLY' THEN
CREATE THE OUTPUT DOCUMENT
ENDIF
UNTIL ALL OF DOCUMENT FORMAT IS READ IN DO
READ THE NEXT (FIRST) DOCUMENT FORMAT
RECORD OF THE SHELL DOCUMENT INTO THE
DOCUMENT FORMAT BUFFER
IF OUTPUT IS NOT 'PRINT ONLY' THEN
WRITE THE DOCUMENT FORMAT RECORD TO THE
OUTPUT DOCUMENT
IF WE ARE WRITING OUT THE FIRST RECORD OF
DOCUMENT FORMAT THEN
NAME THE RECORD
ENDIF
ENDIF
ENDDO
IF OUTPUT IS NOT 'PRINT ONLY' THEN
WRITE THE DOCUMENT FORMAT RECORD TO THE
OUTPUT DOCUMENT
NAME THE RECORD
ENDIF
INITIALIZE THE TWO TSBS AND TSB CONTROL
BLOCKS
HANDLE ANY READ/WRITE ERRORS
HANDLE OUTPUT DOCUMENT OPEN ERRORS
HANDLE VARIABLE DOCUMENT OPEN ERRORS
HANDLE ANY OPEN ERRORS
RETURN TO CALLER
END (MCNSETUP)

TABLE 6
INITIALIZE MENU

BEGIN (MCNSMENU)
UNTIL THE MERGE SETUP MENU IS PROPERLY
ENTERED -OR- THE OPERATOR CANCELLED
WITHOUT CHANGES DO
IF THIS IS THE FIRST TIME THAT THE MENU WILL
BE DISPLAYED OR DID THE OPERATOR CANCEL THE
MENU WITH CHANGES MADE THEN
INITIALIZE THE NUMERIC MENU DESCRIPTORS
FIND THE DEFAULT PAPER FEED TYPE
DETERMINE WHETHER A DEFAULT DISKETTE EXISTS
ON THE SYSTEM AND INITIALIZE THE SHELL
DISKETTE MENU DESCRIPTORS
INITIALIZE THE VARIABLE FILL-IN DISKETTE MENU
DESCRIPTORS
INITIALIZE THE OUTPUT DISKETTE MENU
DESCRIPTORS
UNLOCK THE SYSTEM RESOURCES
INITIALIZE THE DOCUMENT MENU DESCRIPTORS
INITIALIZE THE PAGE NAME LIST MENU
DESCRIPTORS
ENDIF
IF SWITCH CODE MERGE WAS CHOSEN THEN
POINT TO THE SWITCH CODE MERGE MENU
DESCRIPTORS
ELSE
POINT TO THE NAMED VARIABLE MERGE MENU
DESCRIPTORS
ENDIF
PUT UP THE APPROPRIATE SETUP MENU
IF THE MENU WAS CANCELLED WITH EITHER
CHANGES OR NO CHANGES MADE

TABLE 6-continued
INITIALIZE MENU

TO THE MENU THEN
IF THE CANCEL WAS WITH NO CHANGES THEN
TURN ON THE ABORT AND CANCEL FLAGS
ENDIF
ELSE
MARK MENU ITEMS INVALID IF THE OPERATOR DID
NOT SPECIFY A SHALL DOCUMENT NAME, A SHELL
DISKETTE NAME, A VARIABLE FILL-IN DOCUMENT
NAME AND A VARIABLE FILL-IN DISKETTE NAME
IF ALL OF THE REQUIRED PARAMETERS WERE
ENTERED THEN
PROCESS THE PRINT OUTPUT DOCUMENT OPTION
PROCESS THE OUTPUT DOCUMENT NAME OPTION
IF THE OPERATOR SPECIFIED AN INVALID OUTPUT
TYPE THEN
TURN ON THE SETUP ERROR OCCURRED FLAG AND
MARK THE APPROPRIATE MENU ITEMS AS
INVALID
ENDIF
IF NO INVALID OUTPUT TYPE ERROR OCCURRED
THEN
PROCESS THE CANCEL ON ERROR OPTION
PROCESS THE VARIABLE FILL-IN PAGE NAME
LIST OPTION
INVOKE MCNSETUP - CREATE/OPEN SPECIFIED
DOCUMENTS AND INITIALIZE THE SPECIFIED
TSBS
ENDIF
ENDIF
ENDIF
ENDDO
RETURN TO CALLER
END MCNSMENU

DESCRIPTIVE-NAME=MERGE SHELL BUILD

FUNCTION=The Merge Shell Build component (MSB-----) deals with the actual process of building and outputting the shell via the Merge Application. This component is responsible for detecting and saving all *execution* errors.

TABLE 7
BUILD SHELL

BEGIN (MSBBLDSH)
IF NOT FIRST TIME THRU THEN
CALL THE GET SHELL ROUTINE TO PUT THE
OPERATOR SPECIFIED SHELL INTO THE
APPROPRIATE OUTPUT DOCUMENT
ENDIF
PAGINATE AND RESOLVE THE INCLUDES AND
VARIABLES
RECORD THE LAST PAGE
INDICATE END OF SHELL
CALL PRINTER INTERFACE TO ENTER THE LAST
PAGE IN TRAIL PRINT
RESET END OF SHELL
IF NO VARIABLE FOUND IN SHELL THEN
SETUP FOR ABORT
ENDIF
RETURN TO THE CALLER
END MSBBLDSH

TABLE 8
INSERT VALUE INTO OUTPUT

BEGIN (MSBINVAL)
SAVE CHARACTER SET AT END OF VALUE
MOVE CURSOR TO START OF VALUE
SAVE CHAR SET AT START OF VALUE
RESOLVE ANY CHARACTER SET MISMATCHES
AT START OF VALUE
MOVE CURSOR TO END OF SWITCH CODE OR NAMED
VARIABLE
RESOLVE ANY CHARACTER SET MISMATCHES
AT END OF VALUE

TABLE 8-continued
INSERT VALUE INTO OUTPUT

ENDDO
RETURN TO THE CALLER
END (MSBINVAL)

TABLE 9
VARIABLE SEARCH

BEGIN (MSBVSRCH)
INDICATE A VALUE HAS NOT BEEN FOUND
INDICATE END OF VALUE NOT FOUND
IF NOT SWITCH CODE MERGE THEN
CHECK CURRENT VARIABLE FOR NAME MATCH
IF VALUE NOT FOUND THEN
IF NOT AT TOP OF PAGE THEN
PUT REPLACEMENT LIST LOCATION POINTER AT
TOP OF PAGE
ENDIF
UNTIL VARIABLE NAME MATCH FOUND OR END OF
PAGE FOUND DO
CHECK CURRENT VARIABLE FOR NAME MATCH
IF VARIABLE NAME MATCH NOT FOUND THEN
MOVE TO NEXT CONTROL SEQUENCE
ENDIF
ENDDO
ENDIF
IF VALUE FOUND THEN
SAVE LOCATION OF FIRST CHARACTER
FIND END OF VALUE
SAVE LOCATION OF VALUE END
ENDIF
ELSE
INDICATE A VARIABLE WAS FOUND IN SHELL
IF NOT AT END OF DOCUMENT THEN
INDICATE VALUE FOUND
SAVE LOCATION OF VALUE START
MOVE TO NEXT SWITCH CODE OR END OF DOCUMENT
SAVE LOCATION OF END OF VALUE
ENDIF
ENDIF
RETURN TO CALLER
END MSBVSRCH

TABLE 10
SHELL BUILD COMPLETION

BEGIN (MSBCOMP)
REINITALIZE MERGE CONTROL BLOCK
REINITIATE GET CONTROL BLOCK
CLOSE THE FILL-IN DOCUMENT
CLOSE THE SHELL DOCUMENT
CLOSE THE OUTPUT DOCUMENT
COMPLETE PRINTING OF OUTPUT BACKGROUND
RETURN TO CALLER
END MSBCOMP

TABLE 11
RESOLVE INCLUDES

BEGIN (MSBRSINC)
SETUP TO RESOLVE INCLUDED PAGES
RESOLVE INCLUDES BY FETCHING PAGE
HANDLE ERRORS
IF ABORT INDICATED THEN
INDICATE IT IN RETURN CODE
ENDIF
RETURN TO CALLER
END (MSBRSINC)

TABLE 12
RESOLVE PAGE

BEGIN (MSBRSPG)
IF NOT END OF MERGE THEN
IF PRINT OUTPUT THEN
IF PRINT ONLY THEN

TABLE 12-continued
RESOLVE PAGE

IF $SYSDOC1 PRINTING AND PROCESSING THEN
GIVE PAGE TO PRINTER
ELSE
IF $SYSDOC2 IS PRINTING AND PROCESSING
THEN
GIVE PAGE TO PRINTER
ELSE
IF ONE DOCUMENT PRINTING AND THE OTHER
PROCESSING THEN
IF END OF A SHELL THEN
DETERMINE DOCUMENT STATUS
IF SYSTEM DOCUMENT IN THE QUEUE IS
NOT PRINTING THEN
POST MERGE WAITING UNTIL DOCUMENT
NOW PRINTING IS FINISHED
UNTIL SYSTEM DOCUMENT FINISHED
PRINTING OR END PRESSED DO
POLL FOR REQUEST KEY
POLL FOR END KEY
ENDDO
TAKE MESSAGE DOWN
ENDIF
ENDIF
DETERMINE DOCUMENT STATUS
IF DOCUMENT THRU PRINTING THEN
IF NOT AN ABORT THEN
ENDIF
GIVE NEW DOCUMENT TO PRINTER
INDICATE DOCUMENT IS PRINTING
ENDIF
ELSE
IF $SYSDOC1 PROCESSING AND $SYSDOC2
NONEXISTENT THEN
GIVE NEW DOCUMENT TO PRINTER
IF DOCUMENT SUBMITTED TO PRINT THEN
INDICATE DOCUMENT IS PRINTING
ENDIF
ENDIF
ENDIF
ENDIF
ENDIF
ELSE
GIVE PAGE TO TRAIL PRINT
INDICATE DOCUMENT IS PRINTING
ENDIF
SAVE CURRENT PAGE NAME OF OUTPUT DOCUMENT
ENDIF
ELSE
POLL FOR REQUEST KEY
POLL FOR END KEY
ENDIF
RETURN TO THE CALLER
END MSBRSPG
$SYSDOC1 AND $SYSDOC2 ARE TEMPORARY SYSTEM
DOCUMENTS

TABLE 13
GET NEXT REPLACEMENT LIST

BEGIN (MSBBUMPV)
IF NOT SWITCH CODE MERGE THEN
UNTIL NEXT LIST FOUND OR NO MORE LISTS DO
IF ALL REPLACEMENT LISTS ARE TO BE USED AND
IF FIRST TIME THEN
GET FIRST PAGE
ELSE
IF ALL REPLACEMENT LISTS ARE TO BE USED
THEN
SAVE NEXT PAGE NAME OF REPL. LIST
ELSE
IF FIRST TIME THRU THEN
INDICATE DONE ONCE
ENDIF
SAVE NEXT PAGE NAME OF REPL. LIST
ENDIF
IF NOT ON LAST PAGE OF DOCUMENT OR NOT ON
LAST PAGE OF PAGE LIST THEN
GET THE NEXT PAGE
ENDIF

TABLE 13-continued
GET NEXT REPLACEMENT LIST

```
ENDIF
ENDDO
ELSE
IF FIRST TIME THRU THEN
GET THE FIRST PAGE
ELSE
INDICATE MERGE COMPLETE
ELSE
IF NEXT CHARACTER IS A LINE END THEN
MAKE SURE ANOTHER VARIABLE EXISTS
ENDIF
ENDIF
ENDIF
ENDIF
IF NOT FINISHED MERGING THEN
INDICATE PAGE FOUND
UPDATE THE PAGE NAME
ENDIF
ERROR HANDLING
RETURN TO CALLER
END MSBBUMPV
```

TABLE 14
GET INTERMEDIATE SHELL

```
BEGIN (MSBGISHL)
IF PRINT ONLY OUTPUT THEN
IF FIRST TIME THRU THEN
OPEN (CREATE) $SYSDOC1
SET $SYSDOC1 STATUS TO PROCESSING
ENDIF
IF $SYSDOC1 STATUS IS PRINTING THEN
RESET $SYSDOC1 PROCESSING
DELETE $SYSDOC2
OPEN (CREATE) $SYSDOC2
SET $SYSDOC2 STATUS TO PROCESSING
ELSE
IF $SYSDOC2 STATUS IS PRINTING THEN
RESET $SYSDOC2 PROCESSING
DELETE $SYSDOC1
SET $SYSDOC1 STATUS TO PROCESSING
ENDIF
ENDIF
ESTABLISH TSB SESSION WITH ACTIVE DOCUMENT
COPY DOCUMENT FORMAT FROM BUFFER TO ACTIVE DOCUMENT
ENDIF
IF PRINT ONLY OR IF FIRST TIME THRU AND MEDIA OUTPUT THEN
FETCH AND STORE DOCUMENT FORMAT
SETUP TO READ AND STORE DOCUMENT FORMAT
READ DOCUMENT FORMAT
STORE DOCUMENT FORMAT
ENDIF
STORE STARTING PAGE NAME
MOVE OPERATOR SPECIFIED SHELL INTO APPROPRIATE OUTPUT DOCUMENT
RETURN TO THE CALLER
END MSBGISHL
```

DESCRIPTIVE-NAME = MERGE ERRORS

FUNCTION = The Merge Errors component (MER-----) deals with the insertion of the output shell error messages and the quantitative error message at the end of the shell in which the error(s) occurred.

TABLE 15
MERGE EXECUTION ERROR HANDLER

```
BEGIN (MERHNDLR)
GET ADDRESS OF MERGE ERROR CONTROL BLOCK
GET TSB CONTROL BLOCK ADDRESS
GET THE ERROR NUMBER
INDICATE AN EXECUTION ERROR FOUND DURING MERGE
SAVE CURRENT TSB LOCATION
```

TABLE 15-continued
MERGE EXECUTION ERROR HANDLER

```
BUMP THE SEQUENTIAL ERROR NUMBER
DETERMINE WHICH MESSAGE TO USE FROM ERROR MESSAGE TABLE
GET START OF TABLE
SUBTRACT ONE FROM ERROR CODE TO GET CORRECT DISPLACEMENT INTO TABLE
FIND OFFSET OF MESSAGE DISPLACEMENT
SAVE THE MESSAGE NUMBER
GENERATE POINTER TO WORK AREA FOR BUILDING THE
ERROR MESSAGE
ESTABLISH TSB ADDRESSABILITY
SAVE THE POINTER
BUILD MESSAGE
MOVE MESSAGE INTO TSB
ESTABLISH TSB ADDRESSABILITY
CALCULATE HOW MANY CHARACTERS TO MOVE
MOVE MESSAGE INTO TSB
IF CANCEL ON ERROR IS ACTIVE THEN
INDICATE ABORT
ENDIF
RETURN TO THE CALLER
END MERHNDLR
```

TABLE 16
MERGE ERROR MESSAGE NUMBER TABLE

```
BEGIN (MERTBL)
END MERHNDLR
THIS TABLE CONTAINS A LIST OF ALL THE MERGE EXECUTION ERRORS
```

While the invention has been particularly shown and described with reference to a preferred embodiment it will be understood by those skilled in the art that various other changes in form and detail may be made without departing from the spirit and scope of the invention.

Having thus described our invention, what we claim as new and desire to secure by Letters Patent is:

1. In an interactive text processing system in which a document input by way of a keyboard is stored, displayed to an operator, and merged with other keyed data in accordance with directions supplied to said system by an operator interacting with the keyboard and a display unit, the combination which comprises:
   means for signalling, by either a first or a second control code, the location in a document at which an insert of pre-stored text data is to be added to the document;
   means for displaying a first menu of predetermined task selections selectable by an operator through said keyboard for selecting either a first type of merge operation operable in response to said first control code or for selecting a second type of merge operation in response to said second control code;
   means for displaying, when said merge operation operable in response to said first control code is selected, a second menu of predetermined task selections for specifying the identification of a first insert of pre-stored text data;
   means for displaying, when said merge operation operable in response to said second control code is selected, a third menu of predetermined task selections for specifying the identification of a second insert of pre-stored text data; and
   means for fetching in response to the specified identification the specified insert of pre-stored text data and merging said data into said document at the signalled location to produce a revised document.

2. The text processing system recited in claim 1 in which said first control code comprises Switch Codes.

3. The text processing system recited in claim 1 in which said second control code comprises Named Variables.

4. In an interactive text processing system in which a document input by way of a keyboard is stored, displayed to an operator, and merged with other keyed data in accordance with directions supplied to said system by an operator interacting with the keyboard and a display unit, the method which comprises:

signalling, by either a first or a second control code, the location in a document at which an insert of pre-stored text data is to be added to the document;

displaying to the operator a first menu of predetermined task selections selectable by the operator through said keyboard for selecting either a first type of merge operation operable in response to said first control code or for selecting a second type of merge operation in response to said second control code;

displaying, to the operator when said merge operation operable in response to said first control code is selected, a second menu of predetermined task selections for specifying the identification of a first insert of pre-stored text data;

displaying, to the operator when said merge operation operable in response to said second control code is selected, a third menu of predetermined task selections for specifying the identification of a second insert of pre-stored text data; and fetching in response to the specified identification the specified insert of pre-stored text data and merging said data into said document at the signalled location to produce a revised document.

5. The method recited in claim 4 in which said first control code comprises Switch Codes.

6. The method recited in claim 4 in which said second control code comprises Named Variables.

* * * * *